United States Patent [19]

Vanderbusse

[11] 4,059,734

[45] Nov. 22, 1977

[54] METHOD FOR TRANSFERRING DATA INTO A DATA INPUT DURING A TELEPHONE CONNECTION ESTABLISHED OVER AN INTEROFFICE TRUNK

[75] Inventor: Robert Vanderbusse, Oostende, Belgium

[73] Assignee: Siemens Aktiengesellschaft, Munich, Germany

[21] Appl. No.: 624,552

[22] Filed: Oct. 21, 1975

[30] Foreign Application Priority Data

Oct. 22, 1974 Germany ............................ 2450189

[51] Int. Cl.² ............................................. H04M 3/58
[52] U.S. Cl. ................................................ 179/18 BD
[58] Field of Search .................................... 179/18 BD

[56] References Cited

U.S. PATENT DOCUMENTS 3,427,404  2/1969  Finkhauser et al. ............ 179/18 BD Primary Examiner—William C. Cooper
Attorney, Agent, or Firm—Schuyler, Birch, Swindler, McKie & Beckett

[57] ABSTRACT

A method of operating a switching arrangement for a telephone system is described which permits the seizure of data input equipment in an exchange during a telephone connection between two exchanges. Provision is made for dialing a code number after connection of the central control and repeater and controlling the initial and final instants of loop interruption to the other switching center. This initiates operation of the central control at the end of a time lag switching through the interoffice trunk for the transfer of data.

1 Claim, 1 Drawing Figure

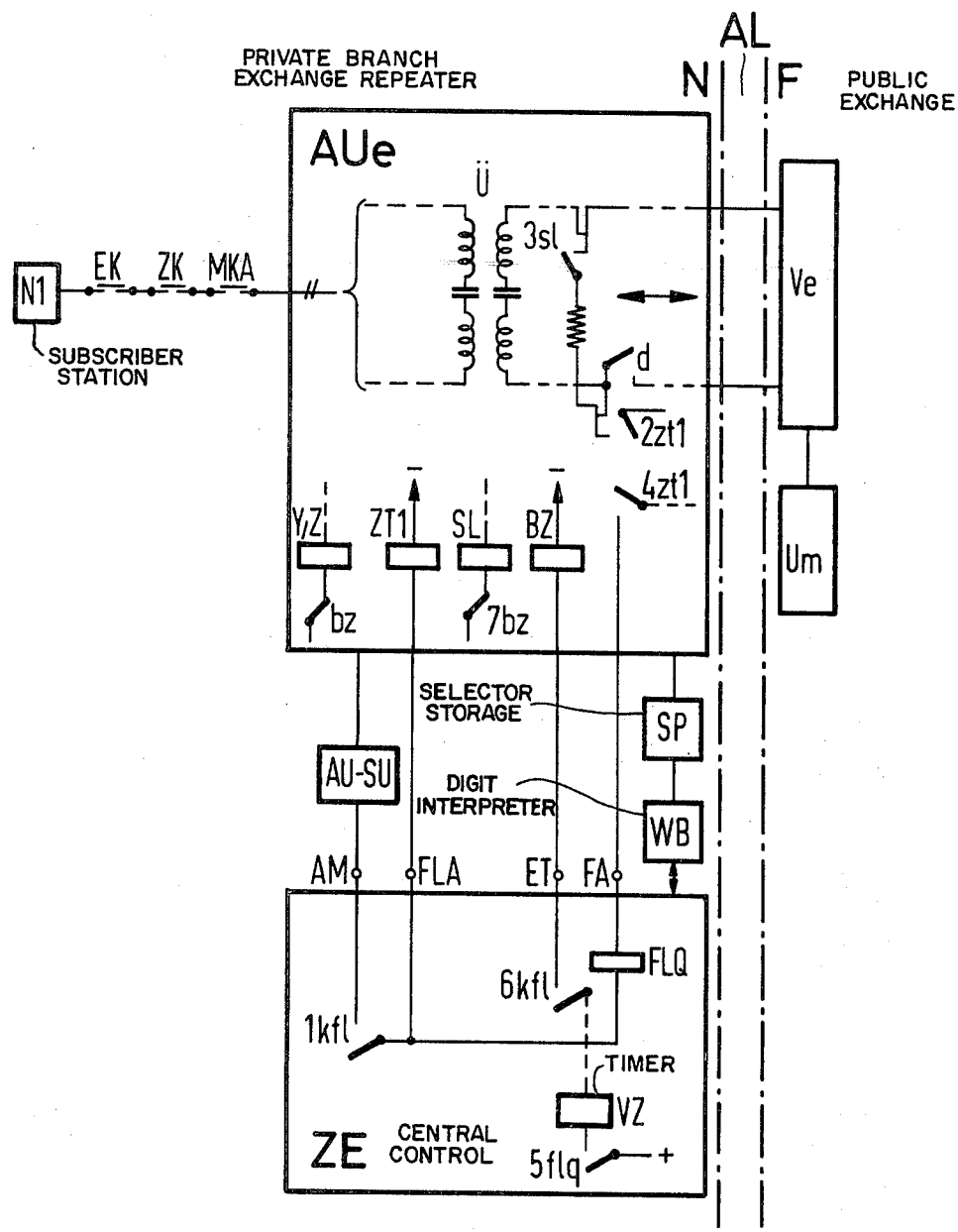

METHOD FOR TRANSFERRING DATA INTO A DATA INPUT DURING A TELEPHONE CONNECTION ESTABLISHED OVER AN INTEROFFICE TRUNK

BACKGROUND OF THE INVENTION

This invention relates to a method of operating a switching arrangement for initiating a transfer of data into a data input device seized over an interoffice trunk in a distant exchange during a telephone connection established over an interoffice trunk between two central offices. The invention has particular application to a telephone connection established over an exchange line between a subscriber of a private branch exchange and a subscriber of a telephone system. In the latter an identification in the repeater allocated to the interoffice trunk, emitted more particularly to the private branch office during the call in progress from a telephone set, brings about a condition initiating a new call and the connection of a central control unit to the repeater. The input equipment for accepting the data selected by an extension user is connected as a result of a loop interruption of specified duration of the speech path.

There is disclosed in U.S. Pat. No. 3,427,404 a switching arrangement wherein upon dialing each digit a selection preparation signal is transmitted which normally initiates in the repeater during the cell setup the connection of a central pulse receiver and which, after the call has been established, initiates in dependence on the existing switching condition a connection changeover during the call in progress. This means that during the call in progress one can initiate with the selection preparation signal a call-back interruption in dependence on the call condition in the repeater. Hence, during the call in progress one can with the aid of the known switching arrangement being about from a telephone set a call transfer, depending on the circuit condition in the repeater. However, with this switching arrangement no selective transfer of another signal over the interoffice trunk is possible.

It is an object of this invention to provide a method for enabling with minimum additional expense in a repeater allocated to an interoffice trunk the connection of a data input device seized in a distant exchange over an interoffice trunk for data transferred from a telephone set.

SUMMARY OF THE INVENTION

In accordance with the invention, the foregoing and other objects are achieved in that provision is made for dialing a specified code number immediately after the connection of the central control unit switching means and the repeater controlling both the initial and the final instants of a loop interruption to the other switching center are enabled, thereby releasing the central control unit at the end of a time lag and switching through the interoffice trunk for the transfer of the data.

In this way, after connection of the central control unit to the repeater by dialing a specified code digit or code number, a loop interruption of specified duration can be transferred via the interoffice trunk so as to bring about the connection of the data input equipment to the speech path. The connection of the central control unit to the repeater, which is seized for the call in progress, takes place in a normal way, so that only the means for interpreting the specified code number and a few additional switching means in the central control unit and a few switching means for each repeater are necessary.

According to another embodiment of the invention, the actuation of the switching means controlling the initial and the final instant of the loop interruption takes place by dialing a specified code number, after emission of a call-back signal. The latter are both emitted from the subscriber involved in a trunk or exchange call and are interpreted in the central control unit by the repeater and after the formation of the holding loop controlled by the call-back initiation to the switching center.

In this way, the consultation-call initiation signal can be employed to bring about the connection of the central control unit for the interpretation of the code digit or code number transferred subsequently with a view to controlling the switching means for the transmission of the loop opening for the connection of the data input equipment. This occurs after the electrical connection of the holding loop toward the public exchange has first been formed by the consultation-call initiation signal.

According to another embodiment of the invention, the call-back signal and subsequent dialing of a specified code number may also be employed for releasing the data input equipment by initiating using the existing connection of the data input equipment to the speech path, the initiation of the data input equipment through retransmission of the call-back signal and of the subsequent dialing of the specified code number from the telephone set transferring the data by means of the renewed loop opening of specified duration in the exchange repeater.

BRIEF DESCRIPTION OF THE DRAWING

The principles of the invention will be more readily understood by reference to the description of a preference embodiment given hereinbelow in conjunction with the accompanying drawing which is a schematic diagram of a switching arrangement constructed according to the invention.

DETAILED DESCRIPTION OF THE PREFERRED EMBODIMENT

Two telephone installations are illustrated in the drawing: a private branch exchange N and a public exchange F. A subscriber station N1 of the private branch exchange N can be connected to an exchange repeater AUe by switching stages EK, ZKA and MKA in a manner in itself known, after dialing the exchange code digit. This establishes a connection via exchange line AL to any public exchange F, or a private branch exchange connected thereto.

In private branch exchange N there is provided a central control unit ZE of known construction to which are allocated at least one selector storage SP and a digit interpreter WB. In the selector storage the dial pulses transmitted by the subscriber N1 are received in the selector storage in a manner in itself known and sent to the digit interpreter WB for the usual evaluation purposes. The central control unit serves to coordinate the control processes and to send instructions for the call establishment using the data received in the digit interpreter.

It is assumed that a connection to the public exchange F exists between subscriber station N1 via switching stages EK, ZK, MKA, exchange repeater AUe and exchange line AL. Thus, the user of telephone N1 is afforded direct access to the public network, and has the possibility of initiating a consultation call, e.g., by pressing a grounding key or dialing a code digit. A call-back signal is thus initiated during the call in progress, and a corresponding consultation switch changeover, as disclosed in the prior art, takes place in the exchange repeater of the private branch exchange in a known manner, not shown herein. As is known, this causes the central control unit and a free selector storage to be connected to the exchange repeater to enable the connection of the consultation call by the user of telephone N1.

However, when the dialed code digit or code number is recognized by the digit interpreter as a special code for the control of the connection of an input unit, then the consultation call is not established by the digit interpreter. In this case the relay KFL (shown only by the presence of contacts 1 kf1 and 6 kf1 in the central control ZE is tripped operated. The resulting closing of contact 1kf1 causes the relay ZT1 in the exchange repeater to be operated. By means of contact 2zt1, the loop made simultaneously over contact 3s1 with the switch changeover and which serves to maintain the exchange repeater during the consultation is interrupted. By means of contact 4zt1, an acknowledgement signal is sent to the central control unit to indicate the start of the loop opening to acknowledgement relay FQL of the central control unit ZE.

By means of contact 5flq, a timing device VZ which as shown herein is a conventional timed relay in the central control unit ZE is started which, after a specified period, transmits a signal to the exchange repeater and trips the relay BZ therein. With the operation of relay BZ and the opening of contact 7bz the consultation status of the exchange repeater is terminated. However, first, relay ZT1 is closed, thereby causing the reclosure of the loop to the exchange. This establishes the duration of the loop opening. Subsequently, after a brief reclosure of the loop over contact 3sl, the consultation status is terminated. Contact 3sl is reopened, thereby reestablishing the transmission path over the repeater and the speech path (relay SL is slowly released). By dialing, the user of telephone N1 can now transfer data, e.g., as voice-frequency signals, into the data input equipment.

If necessary, in a manner not shown herein, a connection can be formed in the exchange repeater for the aforementioned transfer period and the period of the data input equipment, so as to enable transmission of d.c. signals.

The actuation of the data input equipment can simply be effected in dependence upon an end-of-transmission signal selected by the telephone transferring the data, the end-of-transmission signal being interpreted in the data input equipment. However, it is more convenient to actuate the data input equipment from the telephone that transfers the data. For example, this can be effected by retransmitting a call-back signal, thereby reconnecting the central control equipment and the selector storage to the exchange repeater, and by subsequent dialing of a specified code digit or code number, e.g., the same as for initiating the connection of the data input equipment. This reconnects a loop opening of specified duration. This has the advantage that the telephone transferring the data has the control over the disconnection of the data input equipment.

Actuation of the data input equipment may also take place in dependence on a timing device allocated thereto, whereby upon expiration of the time lag prior to actuation of the data input equipment a call tone can still be transmitted to the transferring telephone for the purpose of signalling the commencement of operation of the data input equipment. The time-dependent initiation of the data input equipment can be coordinated without special provision with the initiation of it controlled from the telephone so as to prevent an unnecessarily long seizure of the data input equipment.

After terminating the connection of the data input device, the connection is released either automatically or in dependence on time, if the telephone that has previously transferred the data does not establish a new connection by dialing anew the code number of a subscriber of a public exchange.

The preferred embodiment described above is so described for the purpose of providing an example of a device constructed and operating according to the principles of the invention. It is contemplated that the construction and arrangement of the described embodiment can be changed or modified in a number of ways known to those skilled in the art while remaining within the scope of the invention as defined by the appended claims.

I claim:

1. In a telecommunication switching apparatus comprising a central control, a digit interpreter and an exchange repeater, said exchange repeater including means for initiating call-back connections between subscribers connected thereto and holding the connection to the central office subscriber in a waiting position, a method of operation comprising the steps of:

initiating a call-back connection by dialing a special dial code,
   disconnecting a holding circuit of a waiting subscriber after initiating said call-back connection,
   starting a timing device responsive to said disconnecting step, said timing device determining the period of interruption of the holding circuit and
   through connecting, under the control of the timing device, a transmission path for data transmission between said telecommunication switching apparatus and a public exchange.

* * * * *